United States Patent [19]

Kvant

[11] 4,310,360

[45] Jan. 12, 1982

[54] METHOD FOR PRODUCING PIGMENT FOR USE IN SIZING COMPOSITIONS

[75] Inventor: Magnus B. Kvant, Lund, Sweden

[73] Assignee: Supra Aktiebolag, Sweden

[21] Appl. No.: 88,046

[22] Filed: Oct. 24, 1979

[30] Foreign Application Priority Data

Oct. 30, 1978 [SE] Sweden .............................. 7811215

[51] Int. Cl.$^3$ .............................................. C04B 31/40
[52] U.S. Cl. .................. 106/306; 106/308 C; 106/288 B; 162/177; 162/181 A; 241/16; 241/22; 423/555
[58] Field of Search ................... 106/308 C, 306, 115, 106/109; 162/177, 181 A; 423/555, 266, 264; 241/16, 22

[56] References Cited

U.S. PATENT DOCUMENTS

| | | | |
|---|---|---|---|
| Re. 29,295 | 7/1977 | Steel et al. ....................... | 106/308 C |
| 2,177,269 | 10/1939 | Sullivan ........................... | 106/308 C |
| 2,197,003 | 4/1940 | Mowlds ........................ | 106/306 UX |
| 2,572,932 | 10/1951 | Horsey et al. ....................... | 162/177 |
| 2,810,644 | 10/1957 | Shearer ................................ | 162/177 |
| 3,140,915 | 7/1964 | Axelrad et al. ................. | 423/555 X |
| 3,262,799 | 7/1966 | McCleary et al. .............. | 423/555 X |
| 3,951,675 | 4/1976 | Krempff .............................. | 106/109 |
| 4,174,998 | 11/1979 | Shiel ................................. | 162/181 A |
| 4,196,008 | 4/1980 | Kennedy-Skipton ............... | 106/115 |

FOREIGN PATENT DOCUMENTS

| | | | |
|---|---|---|---|
| 468486 | 4/1972 | Australia .............................. | 423/555 |
| 52-13495 | 2/1977 | Japan .................................. | 423/555 |
| 52-29497 | 3/1977 | Japan .................................. | 423/555 |
| 339797 | 12/1930 | United Kingdom . | |
| 744559 | 2/1956 | United Kingdom . | |
| 1309074 | 3/1970 | United Kingdom . | |
| 2032901 | 5/1980 | United Kingdom ................ | 423/555 |

*Primary Examiner*—Helen M. McCarthy
*Attorney, Agent, or Firm*—Lerner, David, Littenberg & Samuel

[57] ABSTRACT

Methods for producing pigment for use in sizing agents and filler agents for coating paper, cardboard and the like are disclosed. The method includes providing calcium sulphate dihydrate as the pigment and beating the calcium sulphate dihydrate in the presence of a dispersing agent comprising a polysaccharide substituted with carboxyl groups, preferably carboxymethyl cellulose.

11 Claims, 1 Drawing Figure

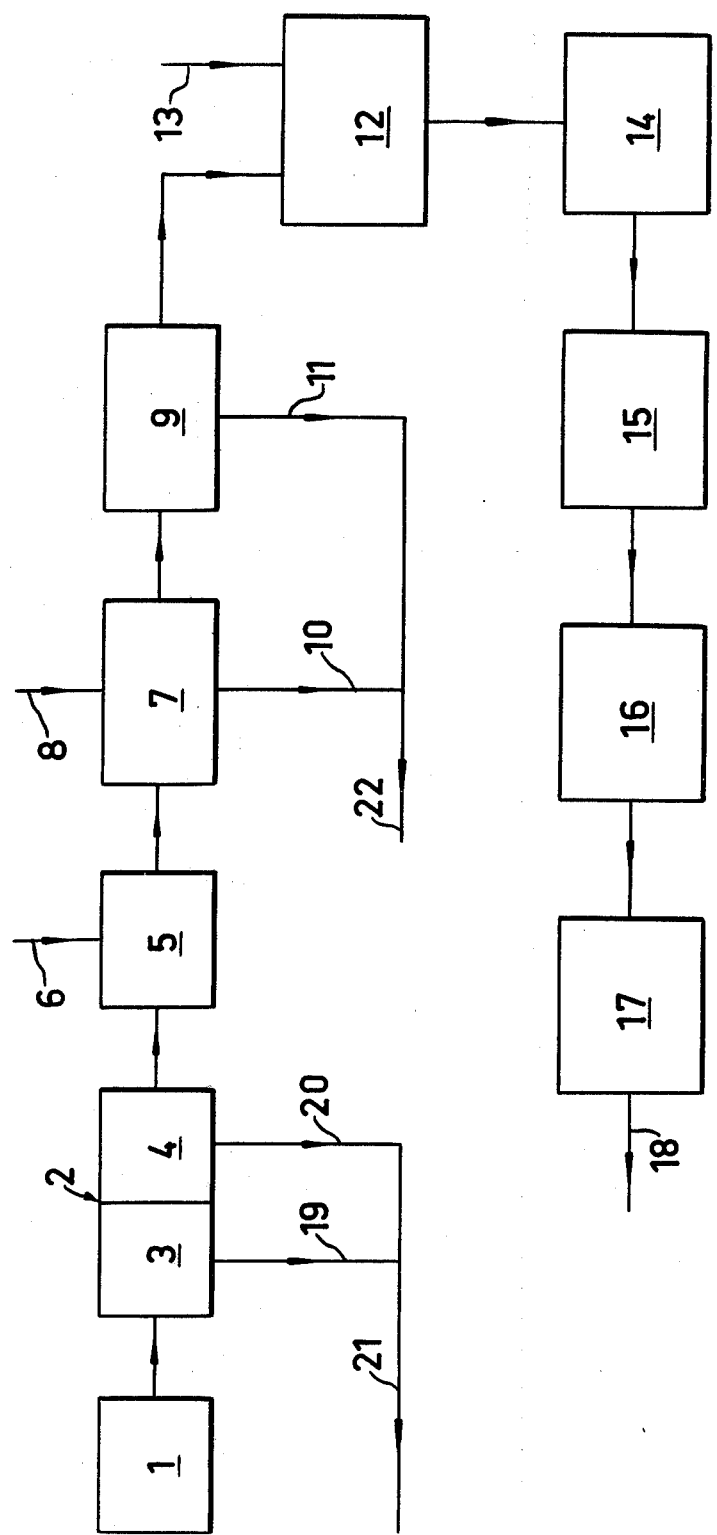

METHOD FOR PRODUCING PIGMENT FOR USE IN SIZING COMPOSITIONS

FIELD OF INVENTION

The present invention relates to a method of making a sizing agent and/or filler agent, especially for paper, cardboard and the like. More particularly, the present invention relates to such method wherein the sizing or filler agent includes calcium sulphate as pigment.

BACKGROUND OF THE INVENTION

The printability properties of sized paper are largely determined by the pigment or pigments applied during sizing. The properties of a ready coating slip depend upon the preparation of the individual components of the coating. Thus, the slip must not include agglomerating pigments, unsolved binding agent particles or other impurities, which may cause scratches in the coated sheet. In addition, the slip must have a viscosity which permits the slip to be pumped all the way to the machine and to flow out on the base paper.

The main constituents in a sizing composition which is to be used for sizing paper and cardboard or as paint, are pigment, binding agent and a liquid phase. It is generally also necessary to add a dispersing agent in order to obtain good distribution of the pigment. The viscosity of the composition can thereby often simultaneously be lowered so that a higher dry content can be obtained without a concomitant deterioration in coatability.

For coating paper, cardboard or the like, kaolin, titanium dioxide or chalk have conventionally been employed as pigment. It has also been proposed, however, to use gypsum. Gypsum has not been used in practice, however, probably because it has been considered that gypsum requires a substantially greater amount of dispersing agent.

Conventional binding agents used for sizing compositions include water-soluble substances such as starch and casein, or dispersions of different polymers in water, such as, for example, polyacrylate, polymethacrylate and polyvinyl alcohol. It is also known, however, to use certain cellulose derivatives, such as methyl cellulose, ethyl cellulose, hydroxyethyl cellulose and carboxymethyl cellulose. A great number of materials are available for use as dispersing agents. The most commonly used dispersing agents, beyond all comparison, are different types of phosphates, particularly sodium hexametaphosphate. This dispersing agent, however, like several others, has certain disadvantages. For example, the binding force of the binding agent used is often reduced. Furthermore, when these dispersing agents are to be used for the coating of paper which is to be offset printed, they can, in certain cases, give rise to emulsification of the printing ink in the offset water, and an undesired toning of the print may thus result. In view thereof in accordance with the method of the present invention, a dispersing agent is utilized which itself acts substantially as a binding agent, viz. a polysaccharide substituted with carboxyl groups.

Calcium sulphate or gypsum is a natural material found in several countries, for example in the Mediterranean countries. Its usual form is the dihydrate, having the composition $CaSO_4.2 H_2O$. Gypsum, however, also exists as a waste product from the manufacture of phosphoric acid, where it often is called "chemical gypsum". The term "calcium sulphate" in connection with the present invention is to be understood as calcium sulphate dihydrate. Due to the abundant supply of gypsum at a relatively low price, it has long been desired to be able to utilize the gypsum as pigment for coating slips. The desire to utilize gypsum for this purpose has not been successfully realized in practice, however, apparently because the special prerequisites which must prevail for obtaining a good result have not been understood.

SUMMARY OF THE INVENTION

In accordance with the present invention these problems have been solved, and pigment can now be produced for use as a sizing or filler agent by providing calcium sulphate (gypsum) and beating the gypsum in the presence of a dispersing agent comprising a polysaccharide substituted with carboxyl groups, and preferably carboxymethyl groups.

In one embodiment of the present invention, the beating step is carried out in the presence of water. In accordance with a preferred embodiment of this invention it has been discovered through various experiments carried out in connection with the development of this invention, that especially good results can be obtained by beating in the presence of carboxymethyl cellulose, usually called CMC, and particularly with CMC having a mean molecular weight of from about 10,000 to 500,000, preferably from about 20,000 to 150,000. When CMC is thus used, it is added in amounts ranging from about 0.5 to 3 percent by weight, calculated on the amount of dry calcium sulphate.

It has thus also been discovered that the particle size of the gypsum is essential. When, for example, a coating composition is to be prepared for use in preparing a mat paper, the gypsum must have a particle size distribution such that about 30 percent by weight have a size smaller than about $2\mu$. For coating compositions to be used in preparing a glazed paper, 95 percent by weight of the material should have a particle size smaller than about $2\mu$. When, however, pigment for filler agents is involved, the particle size of the calcium sulphate should be such that about 50 percent by weight of the material has a particle size smaller than about $5\mu$. The particle size distributions discussed above are determined by means of an Andreasen sedimentation apparatus which is marketed in Sweden by the enterprise Kebo Grave under the reference number 111,904. Test samples are prepared by weighing about 10 g. gypsum slip, to which 2 ml of a 1-% CMC solution is added, whereafter the slip is mixed and stirred with about 40 ml water. The sample is transferred to the sedimentation apparatus, and 10 ml amounts are taken out with a pipette according to the following schedule:

| 1st sample | after | 0 minutes |
| --- | --- | --- |
| 2nd sample | after | 60 minutes |
| 3rd sample | after | 120 minutes |
| 4th sample | after | 1080 minutes |
| 5th sample | after | 1560 minutes |

According to another preferred embodiment of the method of the present invention, a binding agent such as latex or starch is employed. Addition in such case is preferably made subsequent to the beating step. As mentioned above, a high dry content if of great importance for the preparation of an effective and economic coating agent. By selecting the binding agent/dispersing agent selected according to this invention, dry contents for the coating agent as high as about 60 to 80 percent by weight can be achieved in connection with the preparation of mat paper. For such coating agents used to produce glazed paper, dry contents of from about 55 to 80 percent by weight are obtained.

BRIEF DESCRIPTION OF THE DRAWING

The invention may be more fully understood by referring to the drawing which is a block diagram of a method in accordance with the present invention.

DETAILED DESCRIPTION

As is noted above, in accordance with this invention, calcium sulphate dihydrate is employed as the pigment therein. When the so-called chemical gypsum is employed, for example, the gypsum is preferably first purified/bleached, by treating the gypsum with an oxidizing bleaching agent, such as chlorine, hypochlorous acid, hypochlorite, chlorine dioxide and/or peroxides. Such bleaching preferably is carried out with the calcium sulphate being in the form of a suspension in water, preferably at dry contents of, at maximum, 60 percent by weight, and preferably, at maximum, 50 percent by weight. It has also been found that when bleaching with chlorine, hypochlorous acid or hypochlorite it is essential that the pH values in the slurry be held to from about 1.5 to 6, preferably from about 2 to 4, and most preferably 3. The bleaching can be carried out for a period of from about 5 minutes to 1 hour, preferably from about 20 minutes to 30 minutes. When the oxidizing bleaching agent is chlorine or chlorine compounds, these should be added in amounts of from about 0.1 to about 1%, and preferably from about 0.3 to 0.5% active chlorine, calculated on the amount of calcium sulphate. The calcium sulphate can be purified by fractionation, preferably in a cyclone, either prior or subsequent to the bleaching step, in order to remove undesired particles. After the bleaching, the calcium sulphate is washed with water, for example on a filter or in a column, in order to remove chlorine residue, chlorides and oxidizing compounds. The invention is described in greater detail in the following example thereof.

EXAMPLE

(a) Bleaching/Purification of Calcium Sulphate

In this example waste gypsum from the manufacture of phosphoric acid was used as the raw material. The raw material is suspended in water in a container, 1, to a dry content of about 15 percent by weight, and the pH value of the slurry is adjusted to a value below 3. This value is a critical one, because at higher pH values discoloring impurities will adhere to the gypsum particles. Gypsum of the type used in this embodiment includes as impurities, in addition to organic material, heavily discolored gypsum, calcium fluoride and silicates from previous processes. When the pH value for the slurry exceeds 3, acidification is preferably carried out with sulphuric acid. The resultant slurry is then fractionated in a hydrocyclone, 2, whereby a fraction having a particle size of from about 25 to 100$\mu$ was recovered. If the particle size is thus below 25$\mu$, it has been found that dewatering in a subsequent process step would be rendered substantially more difficult. The fraction including particles with a size above 100$\mu$ includes dark-colored particles, partially consisting of tourmaline. However, the rock phosphate which constitutes the starting material for the manufacture of phosphoric acid exists in many different qualities, and the impurities therein can therefore be of various types.

The fractionation was carried out in two steps, 3 and 4, respectively. In the first step, 3, the coarser fraction was removed in line 19, and in the second step, 4, the finer fraction was removed in line 20, and in each case the fractions so removed were combined and carried away in line 21 as waste from the process. By carrying out the separation in this manner it is possible to operate independently of the operation conditions prevailing in the phosphoric acid factory, from which the gypsum was collected. In any event, the resultant slurry had a dry content of about 45 percent by weight. The recovered gypsum fraction was then bleached in a continuous bleaching plant, 5, by addition of chlorine water through line 6. The dry content dropped to about 20 percent by weight as a result of this addition of chlorine water. After addition of the chlorine water the pH value was adjusted to 3, and the bleaching was then carried out by stirring in two tanks connected in series in order to extend the stay-time. The amount of added chlorine was 0.5 percent by weight, calculated on the basis of dry gypsum. After the bleaching step, the slurry was thickened in a sedimentation thickener to a dry content of about 35 percent by weight.

In a subsequent washing vessel, 7, the gypsum was washed in order to remove foaming agents, chlorides, organic material and other impurities. The washing was carried out continuously with water entering through line 8, and flowing countercurrent to the slurry in vertical pipes, and with the gypsum being taken out by a screw at the lower portion of the vessel 7. During this washing step thickening to about 45 percent by weight dry content simultaneously was obtained. Filtering of the slurry resulting from the washing step was then carried out on rotary vacuum filters, 9, and simultaneously water was sprayed thereon, primarily in order to remove residue chlorides. From the filter, 9, a clean, bleached product having a dry content of about 76 percent by weight is obtained. The effluents from the washing vessel, 7, and the filters, 9, are removed through lines 10 and 11, respectively, and can then be combined and removed together through line 22.

(b) Preparation of the Sizing Agent

The clean, bleached product resulting from (a) was supplied to dispersion equipment, 12, while 1.6 percent by weight of carboxymethyl cellulose (CMC), calculated on the basis of dry gypsum, was simultaneously added to the dispersion equipment, 12, through line 13. The CMC was added in the form of a 14% solution. Thereafter the pH value of the solution was increased to 12 by the addition of sodium hydroxide, because in a case such as this one the gypsum can include small amounts of phosphoric acid, which is set free during the beating step. In addition, conventional glaze-raising agents, antifoaming agents, optical bleaching agents, coloring substances and preservatives can be added to this mixture, as may be desired. The various components are continuously supplied to the mixing vessel so as to obtain a flow of about 4 m$^3$/h. Dispersion is effected by means of a rapidly rotating stirrer. From the dispersion equipment, 12, the dispersion is continuously transferred to a vacuum deaerator, 14, for removing entrained air. After deaeration, the dispersion was beaten in a pearl beater, 15, at a temperature of about 50° C., in a single step, cooled in cooling equipment, 16, and then screened in a self-cleaning screen, 17. The final product removed through line 18 was a storage-durable slurry with a dry content of 71%. The product can be pumped and delivered filled in tanks or barrels. Paper coating tests were carried out with compositions prepared in accordance with the method of this invention. For purposes of comparison, coating was carried out under the same conditions with a conventional coating agent which included kaolin as pigment. The results are shown in the Table I below.

TABLE I

|  | Kaolin | Gypsum According to this invention |
|---|---|---|
| Slip Data |  |  |
| Dry content, % | 58.7 | 60.5 |
| Viscosity, Brookfield (100 rpm), cP | 1310 | 1480 |
| Paper data |  |  |
| Coat, g/m$^2$ | 13.6 | 13.6 |
| Substances, g/m$^2$ | 67.6 | 67.6 |
| Thickness, μm | 75 | 78 |
| Density, Kg/m$^3$ | 906 | 868 |
| Bending force, mN | 1,62/0,67 | 1,52/0,61 |
| Water absorption Cobb CL, g/m$^2$ | 33.5 | 21.8 |
| Oil Absorption, Vanceometer, s | >600 | >600 |
| Ink absorption, mm | 7.0 | 6.8 |
| Color absorption, K&N, % | 24.7 | 34.4 |
| Surface strength, IGT, m/s | 0.50 | 0.51 |
| roughness, Bendtsen, 1 kg, ml/min. | 26 | 34 |
| Parker Print Surf 10S, μm | 1.96 | 2.22 |
| Porosity, Bendtsen, ml/min. | 10 | 14 |
| Brightness, % | 72.7 | 74.8 |
| Luminance, % | 78.5 | 79.9 |
| Diffusion coefficient, m$^2$/kg | 54.5 | 56.5 |
| Opacity, % | 92.9 | 92.8 |
| Glaze, % | 43.8 | 42.7 |

The invention is not restricted to the embodiments described, but can be varied within the scope of the inventive concept.

What is claimed is:

1. A method of producing pigment for use in sizing or filler agents comprising the steps of bleaching calcium sulfate dihydrate, recovering a fraction of the said bleached sulfate of predetermined particle size, and beating an aqueous suspension of said bleached calcium sulfate dihydrate fraction in the presence of a dispersing agent comprising sodium carboxymethylcellulose, said suspension of bleached calcium sulfate dihydrate having a dry content in the range of from about 60 to about 80% by weight of said fraction, wherein the particle size distribution is such that 50% by weight of the solids in the beaten aqueous suspension has a particle size smaller than about 5μ.

2. The method of claim 1, wherein said carboxymethyl cellulose has a mean molecular weight of between about 10,000 to 500,000.

3. The method of claim 1, wherein said carboxymethyl cellulose has a mean molecular weight of between about 20,000 and 150,000.

4. The method of claim 1 wherein said carboxymethyl cellulose is added in amounts of between about 0.5 and 3% by weight, calculated on the amount of dry calcium sulphate dihydrate.

5. The method of claim 1, wherein said pigment is to be used in a coating agent for the preparation of mat paper, and wherein said calcium sulphate dihydrate has a particle size distribution such that 30% by weight has a particle size of less than about 2μ.

6. The method of claim 1, wherein said pigment is to be used in a coating agent for the production of glazed paper, and wherein said calcium sulphate dihydrate has a particle size distribution such that 95% by weight has a particle size smaller than about 2μ.

7. The method of claim 1, including adding a binding agent to said calcium sulphate dihydrate.

8. The method of claim 7, wherein said binding agent is added subsequent to said beating step.

9. The method of claim 7, wherein said binding agent is selected from the group consisting of latex, starch and mixtures thereof.

10. The method of claim 1, wherein said beating step is carried out at elevated temperatures.

11. The method of claim 10, wherein said elevated temperatures are below about 130° C.

* * * * *